United States Patent Office 2,933,482
Patented Apr. 19, 1960

2,933,482

POLYPROPYLENE

Guido B. Stampa, Montclair, and Alford G. Farnham, Mendham, N.J., assignors to Union Carbide Corporation, a corporation of New York No Drawing. Application July 19, 1957
Serial No. 672,886

7 Claims. (Cl. 260—93.7)

This invention relates to a process for polymerizing propylene to polymers which are solids at room temperature. More particularly the invention is concerned with the production of crystalline polypropylene substantially free of corrosive catalyst residues and catalyst decomposition products.

Several catalyst systems are known for the polymerization of propylene. Depending on the catalyst, the resultant polymeric product can be an oil, an amorphous rubbery solid or a high-melting crystalline polymer or a mixture of all three.

Lewis acids, such as aluminum chloride, for instance, polymerize propylene to low molecular weight oils only. A Ziegler catalyst, composed of an aluminum alkyl and titanium tetrachloride, converts propylene rapidly to a solid polymer, which can be fractionated by ethyl ether extraction into about equal parts of amorphous rubbery and crystalline polymer. But polymers prepared with these catalysts are difficult to purify, and since part of the halogen of the catalyst is incorporated into the polymer by a side reaction, there is always the danger of metal equipment corrosion, such as injection mold surfaces in the fabrication of the polymer.

A different type of catalyst system known to polymerize propylene is based on transition metal oxides supported on silica or alumina. These catalysts can be readily removed from the polymer and hence the polymer is substantially non-corrosive, but the crystalline fraction is only a small part of the total polymer, the balance being low molecular oils and amorphous solids.

Although various strenuous purification procedures have been proposed to remove the Ziegler alkyl aluminum and transition metal halide residues from the propylene polymers, such as washing with alcohol, filtration, and the like, sufficient of the residues remain in the polymer to be detected by a measurable ash content, as well as by the corrosive behavior of the polymer on metal surface. It is believed that a major cause of the observed corrosion effects is due to organo halide compounds formed by reaction of the catalyst component with propylene and/or propylene polymer. At least some of said organo halide compounds or their decomposition products are volatile enough at molding temperatures to be released from the polymer, the volatilized compound then condensing on cooler metal surfaces, such as the injection mold cavity surface and cause mold staining and pitting, being more severe in the instance of plain carbon steel surfaces and to a lesser but still objectionable extent with chromium plated surfaces.

It has now been found that propylene can be polymerized to a normally solid polymer substantially free of low molecular oils and consisting essentially of solid amorphous polymer and crystalline polymer by contacting propylene with a catalyst composition comprising a halogen-free organo aluminum compound, having the formula $AlR_3$ or $AlR_2H$ wherein each R is a monovalent hydrocarbon radical, and a solid polyvanadic ester, said composition being dispersed in an inert hydrocarbon diluent. The polypropylene thus prepared is devoid of corrosive halogen residues, and when subjected to heat-forming operations, such as molding, extruding or calendering, does not cause corrosion of the metal surfaces of the heat-forming apparatus.

The polyvanadic esters constituting one part of the catalyst composition can be prepared by partial hydrolysis of the ortho vanadium esters represented by the formula $R_3VO_4$ wherein each R is an alkyl group, the number of carbon atoms in any alkyl group not being a determinative factor as regards operability of the polyvanadic ester prepared therefrom.

The ortho esters of vanadium have been known for some time (cf. W. Prandtl and L. Hess, Z. anorg. Chem., 1913, vol. 82, page 103) and are conventionally prepared by reacting together vanadium pentoxide with a large excess of the particular saturated, aliphatic monohydric alcohol at reflux temperature. Although complete hydrolysis of the ortho esters $R_3VO_4$ results in the formation of vanadium pentoxide ($V_2O_5$) which is not catalytically effective in admixture with organo aluminum compound to polymerize propylene to a solid polymer, the employment of smaller quantities of water than that required for complete hydrolysis yields various solid polyvanadic esters including the metavanadic esters $R_3V_3O_9$, and the pentavanadic esters $R_3V_5O_{14}$. This stepwise hydrolysis is analogous to the stepwise condensation with acid of inorganic vanadates to polyvanadates and finally to the pentoxide.

Partial hydrolysis of the ortho vanadium esters is readily obtained by adding a calculated quantity of water to a dilute solution of the ortho ester in a solvent which can be the alcohol (or alcohols) from which the ortho ester was derived, but which is, however, preferably a solvent having no chemical activity in the hydrolysis reaction, such inert solvent being exemplified by dioxane, hydrocarbons such as benzene, toluene, and heptane, and ethers such as diethyl ether. The calculated amount of water lies in a range between 1 and 1.5 moles per mole of ortho ester. Amounts of water more than 1.5 moles give the catalytically inactive vanadium pentoxide and, on the other hand, less than 1 mole of water tends to yield products soluble in the reaction medium having substantially the same catalytic activity as the unhydrolyzed ortho esters.

Another procedure for preparing solid polyvanadic esters is by reaction of vanadium pentoxide with an aliphatic monohydric alcohol as for example, methanol, ethanol, isopropanol, butanol, pentanol, hexanol and octanol. Preferably, the alcohol is used in considerable molar excess to the vanadium pentoxide, e.g. 5 or 10 moles alcohol per mole vanadium pentoxide. The reaction can be conducted by heating the mixture of alcohol and vanadium pentoxide to the alcohol's refluxing temperature for several hours of by ball milling the mixture at room or elevated temperatures. The resultant reaction product by either procedure is a mixture comprising the liquid ortho ester of vanadium, alcohol-insoluble polyvanadic ester, unreacted vanadium pentoxide and alcohol. The solid polyvanadic esters can easily be obtained in admixture with unreacted vanadium pentoxide by filtering the reaction products to remove solid residues, washing said residues with an anhydrous solvent such as ether or benzene and then drying the residue.

The polymerization of propylene in the presence of the catalyst composition consisting of organo aluminum compound and a polyvanadic ester is more effectively carried out by dispersing the catalyst composition in an inert hydrocarbon liquid. By inert is meant that the hydrocarbon liquid is free from reactive groups such as hydroxyl, halogen, amino, and nitro, as well as free from olefinic or acetylenic unsaturation and also free from impurities such as oxygen and water. Hydrocarbon liquids suitable as inert diluent and dispersant for the catalyst composition include purified kerosene, heptane, octane, benzene, and toluene. Such hydrocarbons should be moisture free, since water inactivates the catalyst composition.

Preferably the catalyst composition contains at least one gram mole of organo aluminum compound per gram atom of vanadium as polyvanadic ester. However, a considerable molar excess of organo aluminum compound, e.g. upwards to about 10:1 can be used and this is often desirable for scavenging the reaction system of impurities such as moisture and oxygen.

The concentration of catalyst composition dispersed in the inert hydrocarbon diluent per liter thereof which produces optimum yields of solid polymer is from 1 to 10 milleequivalents of polyvanadic ester and the same or excess molar amounts of organo aluminum compound.

While the catalyst composition is effective in obtaining a very small yield of polymer when propylene is contacted therewith at room temperatures and atmospheric pressure, the polymer yield is greatly benefited by conducting the polymerization at super atmospheric pressures and at temperatures of from about 20° C. to 150° C.

The resultant polymer can be conveniently isolated from the catalyst composition by quenching the reaction mixture with an alcohol such as ethanol, isopropanol, and the like, and then filtering off the polymer. The catalyst can also be removed by washing the reaction mixture with an aqueous alkaline or acidic solution, as sodium hydroxide or hydrochloric acid. Still another procedure is to dissolve the polymer in a hot hydrocarbon solvent, and thereafter filter the solution to remove solid catalyst residues.

The invention is further illustrated in the following examples which are to be construed as exemplifications to those skilled in the art and as not restrictive to the invention except as defined in the appended claims.

*Example 1*

1.89 grams (11.8 m.moles) trimethylvanadate, dissolved in 100 ml. dry dioxane, was partially hydrolyzed by adding 0.276 ml. (15.4 m.moles) water in 50 ml. dry dioxane. After 16 hours the solids formed were separated by centrifuging and washed twice with 250 ml. dry benzene. This polyvanadic ester was then suspended in 1000 ml. dry benzene in a 2-liter stainless steel, medium pressure "PARR" hydrogenation apparatus. 3.1 grams (15.6 m.moles) triisobutyl aluminum was added and then propylene gas was introduced until a pressure of 80 p.s.i.g. was obtained. The reaction mixture was then maintained for 22 hours at room temperature and at 80 p.s.i.g. After that, pressure was released and the reaction mixture quenched with 1000 ml. ethanol. A small amount of solid polymer which was formed was washed with more alcohol, then dissolved in hot xylene and filtered. The polymer was reprecipitated with ethanol, filtered and dried. About 0.1 gram of polymer was isolated, which showed the X-ray crystallinity characteristic for isotactic polypropylene.

*Example 2*

The catalyst for this example was obtained by hydrolyzing 1.937 gram (7.9 m.moles) triisopropylvanadate with 0.19 ml. (10.6 m.moles) water dispersed in 100 ml. dry ethyl ether. The solid polyvanadic ester formed was recovered after 6 hours and washed twice with 250 ml. dry benzene. The recovered polyvanadate was then suspended in 1000 ml. dry benzene in a 2-liter stainless steel hydrogenation apparatus with 4.65 grams (23.4 m.moles) triisobutyl aluminum. Propylene was added to the apparatus at about 60 p.s.i.g. and the temperature then raised to 100° C. thereby increasing the reaction pressure to 1000 p.s.i.g. This pressure was maintained by releasing excess propylene. These conditions of pressure and temperature were maintained for 3½ hours. The reaction was then allowed to cool off and the pressure released. After adding 500 ml. ethanol, about 0.5 gram of crude polymer was isolated from the reaction mixture. The polymer was dissolved in hot Decalin, filtered with the aid of "Celite" filter aid, and reprecipitated with isopropanol. After drying the yield was 0.2 gram. Extraction of the precipitated polymer with diethyl ether for 24 hours in a Bailey-Walker extractor gave a 92 percent by weight yield of insoluble, crystalline polymer having a crystal melting point of 165° C. as determined by the disappearance of birefringence.

It will be observed that the above examples have illustrated the utility of certain solid polyvanadic ester. Comparable catalytic effectiveness can be had from other solid vanadic esters and mixtures thereof in place of a single polyvanadic ester, including but not limited to the partially hydrolyzed solid polyvanadic esters derived from the following ortho esters:

Trimethyl vanadate
Tri-n-propyl vanadate
Triisoamyl vanadate
Triisooctyl vanadate
Tri-n-decyl vanadate
Tri-2-undecyl vanadate
Tri-n-dodecyl vanadate
Tri-n-octadecyl vanadate In place of the alkyl aluminum compound employed in the previous examples as one of the catalyst components, other organo aluminum compounds free from halogen compounds and having the formula $AlR_3$ or $AlR_2H$ wherein R is a monovalent hydrocarbon radical, can be substituted in whole or in part. Examples of such are the following:

Triphenyl aluminum
Diethyl isobutyl aluminum
Triisopropyl aluminum
Diisobutyl ethyl aluminum
Diisobutyl aluminum hydride
Triisoamyl aluminum
Trioctyl aluminum
Tridodecyl aluminum
Tricyclohexyl aluminum The solid polymers obtained from the polymerization of propylene in the presence of an organo aluminum compound and a polyvanadic ester are suitable for the production of molded and extruded articles, as non-corrosive electrical insulation, and for the manufacture of films, sheeting and fibers. The absence therefrom of corrosive halogen residues not only prevents corrosion of metallic substances coming in contact therewith but also improves the stability of the polymer when exposed to sunlight and weathering conditions.

What is claimed is:

1. Method for polymerizing propylene to a crystalline polymer which comprises contacting propylene under polymerizing conditions with a catalytic amount of a catalyst composition consisting essentially of at least one organo compound of aluminum selected from the group consisting of $AlR_3$ and $AlHR_2$ wherein R is a monovalent hydrocarbon radical, and a polyvandadic ester being the partial hydrolysis product of an ortho vanadium ester having the formula $R_3VO_4$ wherein R is an alkyl group, said catalyst composition being dispersed in an inert hydrocarbon liquid.

2. Method according to claim 1 wherein the organo aluminum compound is a trialkyl aluminum.

3. Method according to claim 1 wherein there is present from 1 to 10 milligram atoms of vanadium as polyvanadic ester and at least an equimolar amount of said organo aluminum compound per liter of hydrocarbon liquid.

4. Method according to claim 1, wherein the polyvanadic ester is a partially hydrolyzed ester obtained by hydrolyzing with between 1 and 1.5 moles of water a mole of vanadium ester having the formula $R_3VO_4$ wherein R is an alkyl group.

5. Method according to claim 1 wherein the polymerization reaction temperature is in the range of from about 20° C. to about 150° C.

6. Method for polymerizing propylene to a crystalline polymer which comprises contacting propylene under polymerizing conditions with a catalytic amount of a catalyst composition consisting essentially of at least one organo-aluminum compound selected from the group consisting of $AlR_3$ and $AlHR_2$ wherein R is a monovalent hydrocarbon radical, and a polyvanadic ester being the partial alcoholysis product of vanadium pentoxide with a molar excess of an aliphatic monohydric alcohol, said catalyst composition being dispersed in an inert hydrocarbon liquid.

7. Method according to claim 6 wherein the polymerization reaction temperature is in the range of from about 20° C. to about 150° C.

References Cited in the file of this patent

FOREIGN PATENTS

| | | |
|---|---|---|
| 534,888 | Belgium | Jan. 31, 1955 |
| 538,782 | Belgium | Dec. 6, 1955 |